United States Patent
Ishihara et al.

(10) Patent No.: US 7,415,898 B2
(45) Date of Patent: Aug. 26, 2008

(54) TORQUE DETECTING APPARATUS AND ELECTRIC POWER STEERING APPARATUS

(75) Inventors: Toshiharu Ishihara, Kashiwara (JP); Takeshi Izumi, Kashiwara (JP); Yoshitomo Tokumoto, Nabari (JP); Taisuke Tsujimoto, Kashiwara (JP); Naoki Nakane, Toyota (JP)

(73) Assignees: Denso Corporation (JP); JTEKT Corporation (JP)

( * ) Notice: Subject to any disclaimer, the term of this patent is extended or adjusted under 35 U.S.C. 154(b) by 0 days.

(21) Appl. No.: 11/193,854

(22) Filed: Jul. 29, 2005

(65) Prior Publication Data

US 2006/0021451 A1  Feb. 2, 2006

(30) Foreign Application Priority Data

Jul. 29, 2004 (JP) ............................. 2004-222302
Aug. 27, 2004 (JP) ............................. 2004-248850
Aug. 27, 2004 (JP) ............................. 2004-249063

(51) Int. Cl.
*G01L 3/10* (2006.01)

(52) U.S. Cl. ............................................. 73/862.331
(58) Field of Classification Search ............ 73/862.331, 73/862.325, 862.321, 862.191, 862.08
See application file for complete search history.

(56) References Cited

U.S. PATENT DOCUMENTS

| | | | | |
|---|---|---|---|---|
| 4,663,208 A | * | 5/1987 | Ninomiya et al. | ............ 428/138 |
| 4,909,088 A | * | 3/1990 | Tsals | ..................... 73/862.335 |
| 5,796,014 A | | 8/1998 | Chikaraishi et al. | |
| 5,817,952 A | * | 10/1998 | Swisher et al. | ......... 73/862.335 |
| 6,301,975 B1 | * | 10/2001 | Chikaraishi | ............ 73/862.331 |
| 6,484,592 B2 | * | 11/2002 | Sezaki | .................. 73/862.335 |
| 6,707,185 B2 | * | 3/2004 | Akutsu et al. | ................. 310/71 |
| 6,912,923 B2 | * | 7/2005 | Froehlich et al. | ........ 73/862.333 |
| 6,925,893 B2 | * | 8/2005 | Abe et al. | .............. 73/862.332 |
| 7,086,295 B2 | * | 8/2006 | Izumi | .................... 73/862.325 |
| 2002/0189371 A1 | | 12/2002 | Nakane et al. | |

(Continued)

FOREIGN PATENT DOCUMENTS

GB 831795 * 3/1960

(Continued)

OTHER PUBLICATIONS

Patent Abstract of Great Britain GB2051305, Jan. 14, 1981.*

(Continued)

*Primary Examiner*—Edward Lefkowitz
*Assistant Examiner*—Punam Patel
(74) *Attorney, Agent, or Firm*—Darby & Darby P.C.

(57) ABSTRACT

A torque detecting apparatus according to the present invention includes a first shaft and a second shaft connected coaxially to each other through a connecting shaft, a permanent magnet fixed to the first shaft, a plurality of soft magnetic members having a collar provided therein, fitted by pressing with the second shaft and disposed in a magnetic field of the permanent magnet to form a magnetic circuit, and a detector for detecting magnetic flux generated from the soft magnetic members, wherein the soft magnetic members are integrally molded with a mold body made of synthetic resin, and when a torque is applied to the first shaft or the second shaft, the torque is detected based on an output of the detector. The collar is made of a non-magnetic material.

4 Claims, 15 Drawing Sheets

U.S. PATENT DOCUMENTS

| | | | |
|---|---|---|---|
| 2003/0167857 A1* | 9/2003 | Sugimura et al. | 73/862.333 |
| 2003/0209087 A1 | 11/2003 | Nakane et al. | |
| 2004/0074314 A1* | 4/2004 | Nakane et al. | 73/862.331 |
| 2004/0074316 A1* | 4/2004 | Nakane et al. | 73/862.333 |
| 2004/0250631 A1* | 12/2004 | Pattok et al. | 73/862.331 |
| 2005/0223820 A1* | 10/2005 | Murakami et al. | 73/862.331 |

FOREIGN PATENT DOCUMENTS

| | | | |
|---|---|---|---|
| JP | 2003-149062 A | 5/2003 | |
| JP | 2005-98821 A | 4/2005 | |

OTHER PUBLICATIONS

Patent Abstract of Japan JP1015511, Jan. 19, 1989.*
Patent Abstract of Japan JP59092754, May 29, 1984.*
Patent Abstract of Japan JP8280147, Oct. 22, 1996.*
Patent Abstract of Japan JP3150030, Jun. 26, 1991.*
Patent Abstracts of Japan for JP2003-149062 published May 21, 2003.

* cited by examiner

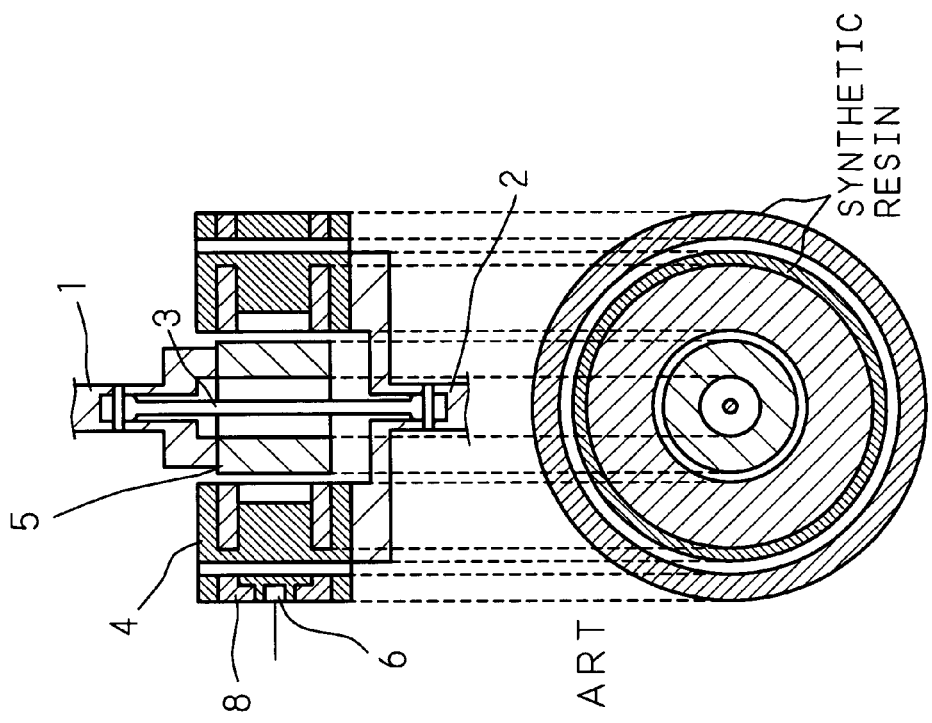
FIG. 1B
PRIOR ART
FIG. 1C
PRIOR ART
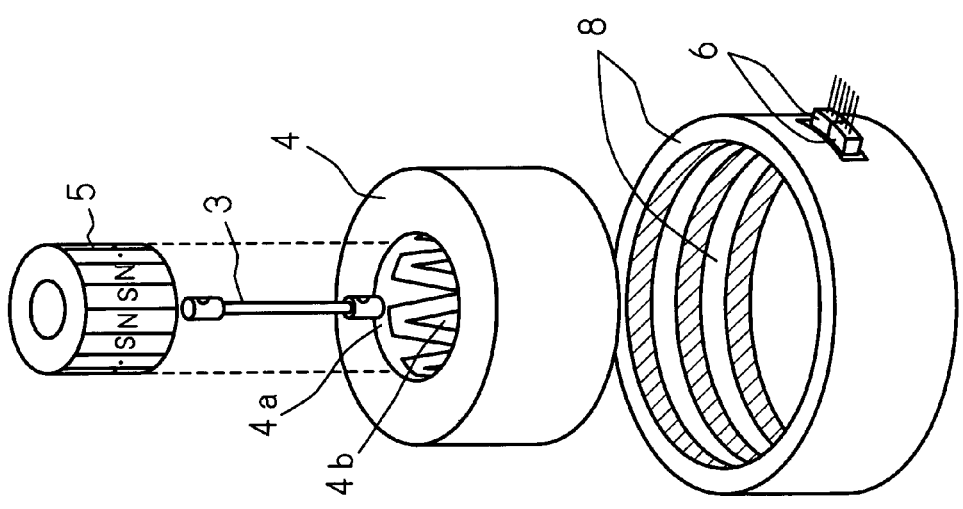
FIG. 1A
PRIOR ART

A-A'

FIG. 6A
FIG. 6B
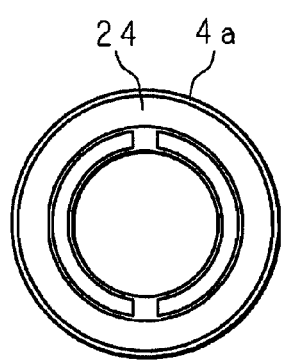
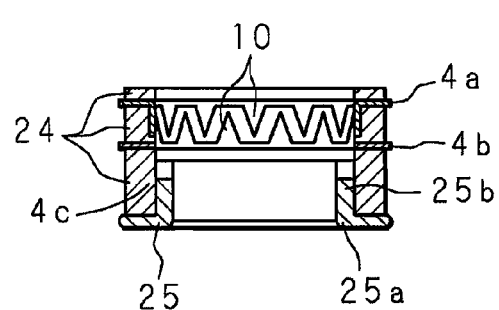

FIG. 10A
FIG. 10B
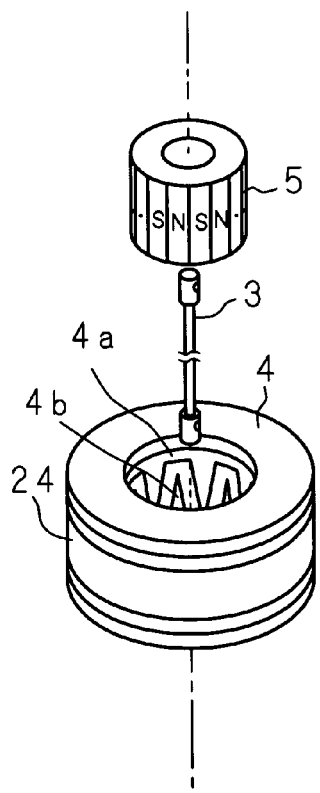
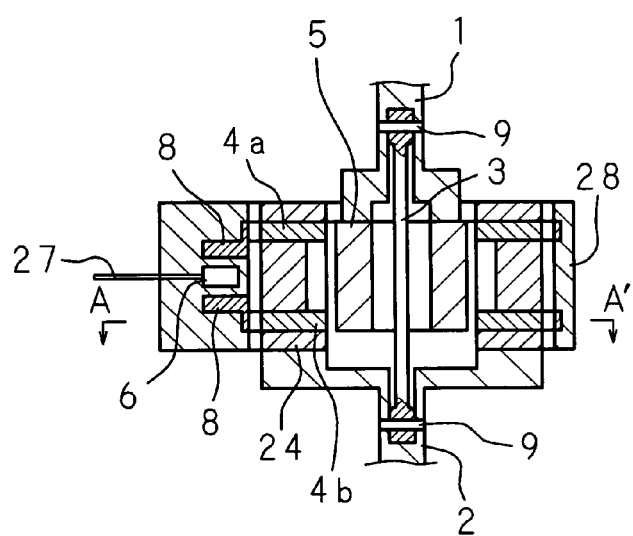
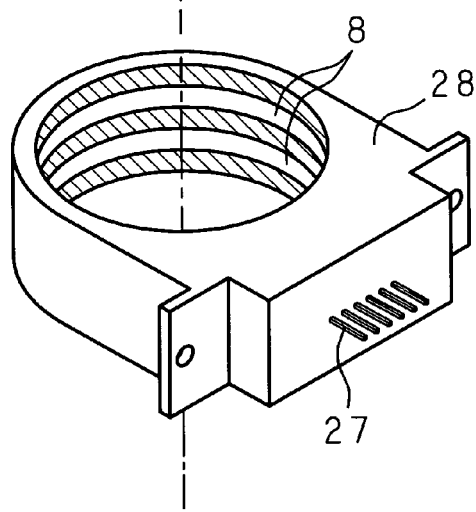
FIG. 10C
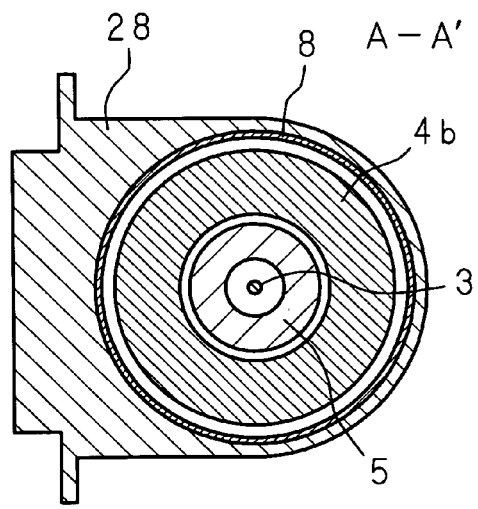

TORQUE DETECTING APPARATUS AND ELECTRIC POWER STEERING APPARATUS

CROSS-REFERENCE TO RELATED APPLICATIONS

This Nonprovisional application claims priority under 35 U.S.C. §119(a) on Patent Application No. 2004-222302 filed in Japan on Jul. 29, 2004, Patent Application No. 2004-248850 filed in Japan on Aug. 27, 2004, and Patent Application No. 2004-249063 filed in Japan on Aug. 27, 2004, the entire contents of which are hereby incorporated by reference.

BACKGROUND OF THE INVENTION

1. Field of the Invention

The present invention relates to a torque detecting apparatus designed appropriately for use in an electric power steering apparatus for a vehicle or the like and comprising a first shaft and a second shaft connected coaxially to each other through a connecting shaft, a permanent magnet fixed to the first shaft, a plurality of soft magnetic members fitted by pressing via a collar with the second shaft and disposed in a magnetic field of the permanent magnet to form a magnetic circuit, and a detector for detecting magnetic flux generated from the soft magnetic members, wherein the soft magnetic members are integrated by molding with synthetic resin, and when a torque is applied to the first shaft or the second shaft, the torque is detected based on an output of the detector.

The present invention also relates to a torque detecting apparatus designed appropriately for use in an electric power steering apparatus for a vehicle or the like and comprising a first shaft and a second shaft connected coaxially to each other through a connecting shaft, a permanent magnet fixed to the first shaft, a plurality of soft magnetic members fixed to the second shaft and disposed in a magnetic field of the permanent magnet to form a magnetic circuit, and a detector for detecting magnetic flux generated from the soft magnetic members, wherein when a torque is applied to the first shaft or the second shaft, the torque is detected based on an output of the detector.

The present invention further relates to a torque detecting apparatus designed appropriately for use in an electric power steering apparatus for a vehicle or the like and comprising a first shaft and a second shaft connected coaxially to each other through a connecting shaft, a permanent magnet fixed to the first shaft, a plurality of soft magnetic members fixed to the second shaft and disposed in a magnetic field of the permanent magnet to form a magnetic circuit, a plurality of auxiliary soft magnetic members magnetically coupled to the soft magnetic members for inducing magnetic flux from the soft magnetic members, and a detector for detecting the magnetic flux induced by the auxiliary soft magnetic members, wherein when a torque is applied to the first shaft or the second shaft, the torque is detected based on an output of the detector; and an electric power steering apparatus equipped with the torque detecting apparatus.

2. Description of the Related Art

An electric power steering apparatus for a vehicle is known, which drives an electric motor to assist the steering thereby relieving the load to a driver. Such an electric power steering apparatus comprises an input shaft connected to a steering member (a steering wheel or a handle), an output shaft connected via a pinion and a rack etc. to wheels to be steered, and a connecting shaft for connecting the input shaft with the output shaft. A torque detecting apparatus detects a torque applied to the input shaft by a torsion angle generated at the connecting shaft, an electric motor for steering assistance which is worked with the output shaft is controlled and driven in response to the detected torque. The torque detecting apparatus in such a electric power steering apparatus is conventionally constructed using a rotation detecting apparatus such as a magnetic detection resolver for detecting the location of rotation by coils or an optical encoder for detecting the location of rotation by the transmission of light.

Also disclosed in Japanese Patent Application Laid-open No. 2003-149062 is a torque sensor, as shown in an exploded perspective view of FIG. 1A, a vertical sectional view of FIG. 1B, and a traverse sectional view of FIG. 1C. The torque sensor comprises an input shaft 1 and an output shaft 2 connected coaxially to each other through a torsion bar 3, an annular 24-pole permanent magnet 5 fixed to the input shaft 1, a magnetic yoke 4 fixed to the output 2 and consisting of a plurality of soft magnetic members 4a and 4b disposed in a magnetic field of the permanent magnet 5 to form a magnetic circuit, two magnetism collecting rings 8, 8 magnetically coupled to the magnetic yokes 4a and 4b for inducting magnetic flux from the magnetic yokes 4a and 4b, and two magnetic sensors 6, 6 (Hall ICs) for detecting the magnetic flux induced by the magnetism collecting rings 8, 8. When a torque is applied to the input shaft 1, the torque is detected based on outputs of the magnetic sensors 6, 6.

The applicants of the present invention have proposed a torque sensor disclosed in Japanese Patent Application Laid-open No. 2005-98821, as shown in FIGS. 1A to 1C, where the magnetic yokes 4a and 4b are integrally molded with synthetic resin while the magnetism collecting rings 8, 8 and the magnetic sensors 6, 6 are integrally molded with synthetic resin with respect to the torque sensor described above.

The torque sensor described above has magnetic yokes 4a and 4b which are integrally molded with synthetic resin and fitted via a not-shown collar with the output shaft 2 by pressing. Since the collar is made of a magnetic material (S43C), the collar may affect the above magnetic circuit. Also, when the output shaft is fitted by pressing with the collar, scraping dusts may generate, which then affect the magnetic circuit.

Also, in the torque sensor described above, two steps are needed for molding the magnetism collecting rings 8, 8, the magnetic sensors 6, 6, and the circuit board with the synthetic resin. More specifically, the first step is conducted to mold the magnetic sensors 6, 6 and the circuit board as electronic components with flexible synthetic resin (for example, hot melt). At the second step, the magnetism collecting rings 8, 8 are molded with rigid synthetic resin (for example, PBT). This relieves the adverse effect of the rigid synthetic resin over the electronic components.

However, the synthetic resin used at the first step fails to provide a desired physical strength of bonding with the circuit board etc. When applied to heat many times and repeatedly expanded and contracted, the synthetic resin will detach from the circuit board etc. and finally a gap 30 will be generated between the synthetic resin and the circuit board 19, as shown in FIG. 2.

Moreover, the torque sensor described above requires a harness and a connector for connection with the controller of the electronic power steering apparatus, thus increasing the component cost and the number of the components.

BRIEF SUMMARY OF THE INVENTION

The present invention has been made with the aim of solving the above problems, and it is an object of the present invention to provide a torque detecting apparatus in which the magnetic circuit is hardly affected by the collar for fitting by pressing the magnetic yokes with the output shaft.

It is another object of the present invention to provide a torque detecting apparatus in which even if scraping dusts are generated when the output shaft is by pressed into the collar for tightening the magnetic yokes to the output shaft, the scraping dusts will hardly affect the magnetic circuit.

It is a further object of the present invention to provide a torque detecting apparatus in which the synthetic resin for molding can provide a desired physical strength of bonding with the electronic component and thus no gap generates by detachment from the electronic component.

It is a still further object of the present invention to provide a toque detecting apparatus which can minimize the component cost and the number of the components while requiring no harnesses and connectors for connection with the outside.

It is a still further object of the present invention to provide an electric power steering apparatus which can minimize the component cost and the number of the components while requiring no harnesses and connectors for connection with the torque detecting apparatus.

A torque detecting apparatus according to the present invention is characterized by comprising a first shaft and a second shaft connected coaxially to each other through a connecting shaft, a permanent magnet fixed to the first shaft, a plurality of soft magnetic members having a collar provided therein, fitted by pressing with the second shaft and disposed in a magnetic field of the permanent magnet to form a magnetic circuit, and a detector for detecting magnetic flux generated from the soft magnetic members, wherein the soft magnetic members are integrated by molding with synthetic resin, when a torque is applied to the first shaft or the second shaft, it is detected based on an output of the detector, and the collar is made of a non-magnetic material.

The torque detecting apparatus according to the present invention is characterized by using a softer material of the collar than that of the second shaft.

A torque detecting apparatus according to the present invention is characterized by comprising a first shaft and a second shaft connected coaxially to each other through a connecting shaft, a permanent magnet fixed to the first shaft, a plurality of soft magnetic members fixed to the second shaft and disposed in a magnetic field of the permanent magnet to form a magnetic circuit, and a detector connected with a circuit board for detecting magnetic flux generated from the soft magnetic members, wherein the detector and the circuit board are molded with synthetic resin, when a torque is applied to the first shaft or the second shaft, it is detected based on an output of the detector. Also, the circuit board has one or a plurality of through holes which are filled with the synthetic resin.

In the torque detecting apparatus, the first shaft and the second shaft are coaxially connected to each other by the connecting shaft while the permanent magnet is fixed to the first shaft. The soft magnetic members are fixed to the second shaft and disposed in the magnetic field of the permanent magnet thus to form a magnetic circuit, and then the detector detects magnetic flux generated from the soft magnetic members. The detector is connected with the circuit board, the detector and the circuit board are molded with the synthetic resin. When a torque is applied to the first shaft or the second shaft, the torque is detected based on an output of the detector. The through holes provided in the circuit board are filled with the synthetic resin.

A torque detecting apparatus according to the present invention is characterized by comprising a first shaft and a second shaft connected coaxially to each other through a connecting shaft, a permanent magnet fixed to the first shaft, a plurality of soft magnetic members fixed to the second shaft and disposed in a magnetic field of the permanent magnet to form a magnetic circuit, a plurality of auxiliary soft magnetic members magnetically coupled to the soft magnetic members for inducing magnetic flux from the soft magnetic members, and a detector connected with a circuit board for detecting the magnetic flux induced by the auxiliary soft magnetic members, wherein the detector and the circuit board are molded with synthetic resin, when a torque is received by the first shaft or the second shaft, it is detected based on an output of the detector, and the circuit board has one or a plurality of through holes which are filled with the synthetic resin.

In the torque detecting apparatus, the first shaft and the second shaft are coaxially connected to each other through the connecting shaft while the permanent magnet is fixed to the first shaft. The soft magnetic members are fixed to the second shaft, disposed in the magnetic field of a permanent magnet to form a magnetic circuit, and magnetically coupled with the auxiliary soft magnetic members which induce the magnetic flux from the soft magnetic members. The detector detects the magnetic flux induced by the auxiliary soft magnetic members. The detector is connected with the circuit board, and the detector and the circuit board are molded with the synthetic resin. When a torque is applied to the first shaft or the second shaft, the torque is detected based on an output of the detector. The through holes provided in the circuit board are filled with the synthetic resin.

A torque detecting apparatus according to the present invention is characterized by comprising a first shaft and a second shaft connected coaxially to each other through a connecting shaft, a permanent magnet and a plurality of soft magnetic members fixed coaxially and magnetically coupled to the first shaft and the second shaft respectively, a plurality of auxiliary soft magnetic members magnetically coupled to the soft magnetic members, one or a plurality of detectors for detecting magnetic flux induced by the auxiliary soft magnetic members, and a mold body made of synthetic resin for molding the auxiliary soft magnetic members and the detector, wherein a torque applied to the first shaft or the second shaft is detected based on an output of the detector. Also, the detector has a plurality of pins projected from the mold body, for connection with the outside.

An electric power steering apparatus according to the present invention is characterized by comprising an electric motor for steering assistance, a torque detecting apparatus defined in claim 5, and a drive-control unit contained in a housing for controlling the drive of the electric motor based on torque detected by the torque detecting apparatus, wherein the housing includes a circuit board projected therefrom and having a plurality of through holes, and the drive-control unit is connect with the torque detecting apparatus by inserting the pins projected from the mold body of the torque detecting apparatus into the through holes respectively.

According to the torque detecting apparatus of the present invention, the torque detecting apparatus can be achieved, in which the magnetic circuit is hardly affected by the collar for fitting by pressing the magnetic yokes with the output shaft.

According to the torque detecting apparatus of the present invention, the torque detecting apparatus can be achieved, in which any scraping dusts produced by the collar for tightening the magnetic yokes to the output shaft being fitted by pressing with the output shaft hardly affect the magnetic circuit.

According to the torque detecting apparatus of the present invention, the torque detecting apparatus can be achieved, in which the synthetic resin for molding provides a desired physical strength of bonding with the circuit board and thus no gap generates by detachment from the circuit board.

According to the toque detecting apparatus of the present invention, the torque detecting apparatus can be achieved, which is capable of minimizing the component cost and the number of the components while requiring no harnesses and connectors for connection with the outside.

According to the electric power steering apparatus of the present invention, the electric power steering apparatus can be achieved, which is capable of minimizing the component cost and the number of the components while requiring no harnesses and connectors for connection with the torque detecting apparatus. In addition, the circuitry of the detector in the torque detecting apparatus can solitarily be controlled by the circuit board of the drive-control unit in the electric power steering apparatus.

The above and further objects and features of the invention will more fully be apparent from the following detailed description with accompanying drawings.

BRIEF DESCRIPTION OF THE SEVERAL VIEWS OF THE DRAWINGS

FIGS. 1A to 1C are explanatory views showing a configuration of a conventional torque detecting apparatus;

FIGS. 6A and 6B are explanatory views showing a yoke and a collar fastened by pressing in the torque detecting apparatus shown in FIG. 5;

FIGS. 10A to 10C are explanatory views schematically showing a configuration of a torque detecting apparatus according to Embodiment 3 of the present invention;

DETAILED DESCRIPTION OF THE INVENTION

The following description will explain in detail the present invention based on the drawings illustrating some embodiments thereof.

Embodiment 1

Figure 2:
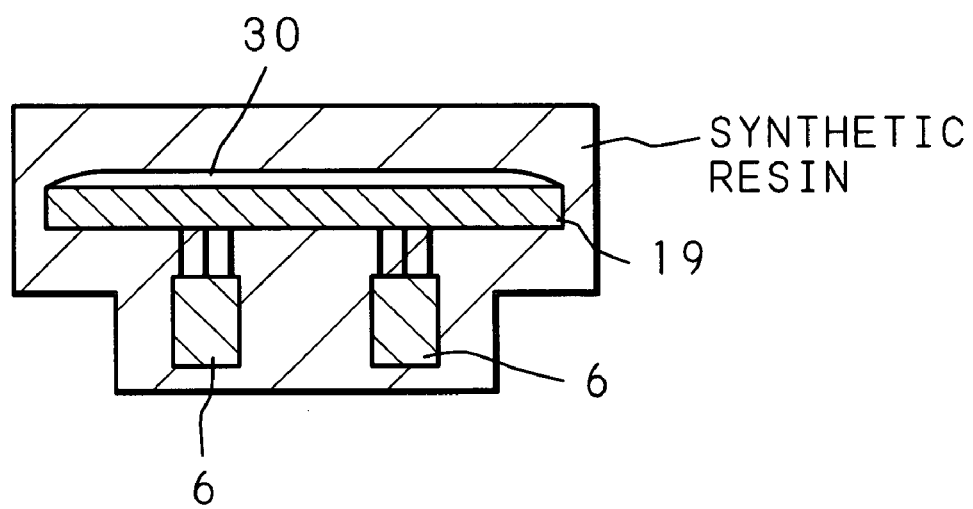
FIG. 2 is an explanatory view showing a problem of the conventional torque detecting apparatus.
Figure 3A:
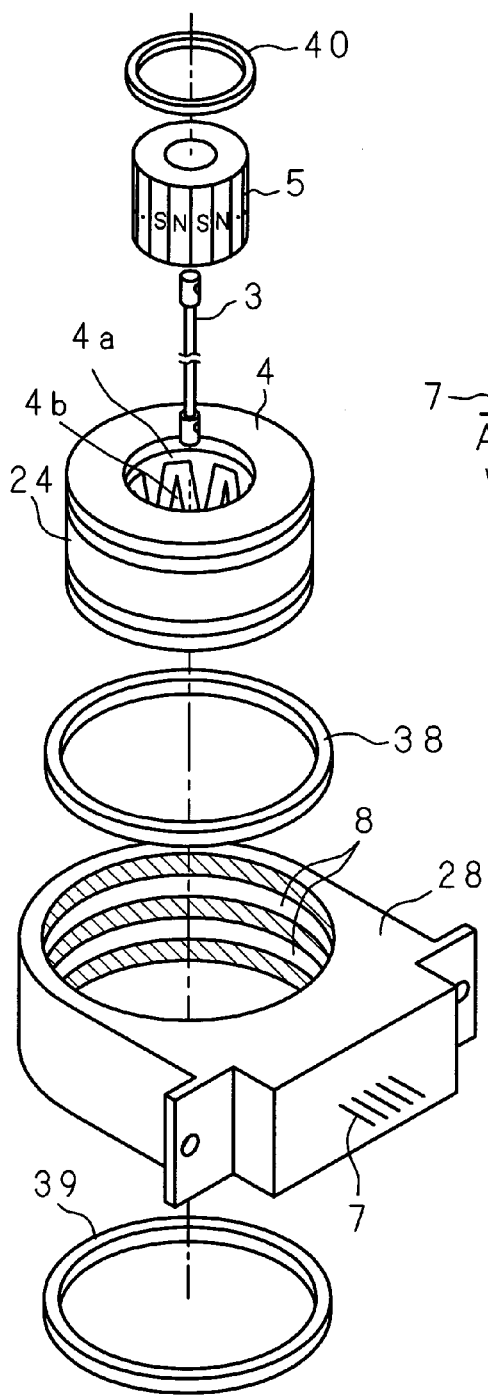
FIGS. 3A to 3C are explanatory views showing a configuration of a torque detecting apparatus according to Embodiment 1 of the present invention.
Figure 3B:
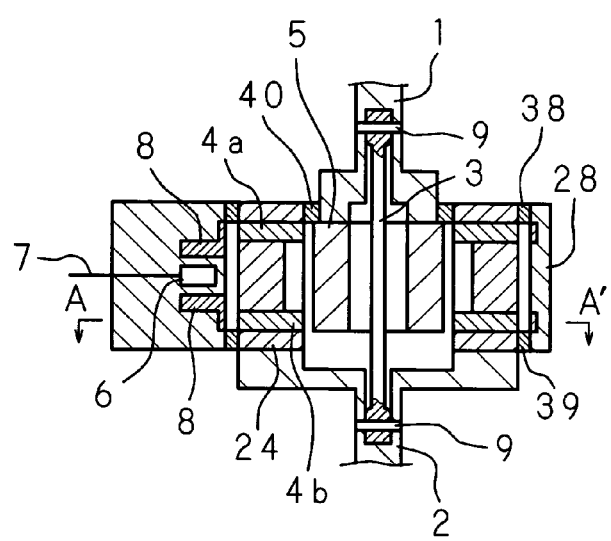
Figure 3C:
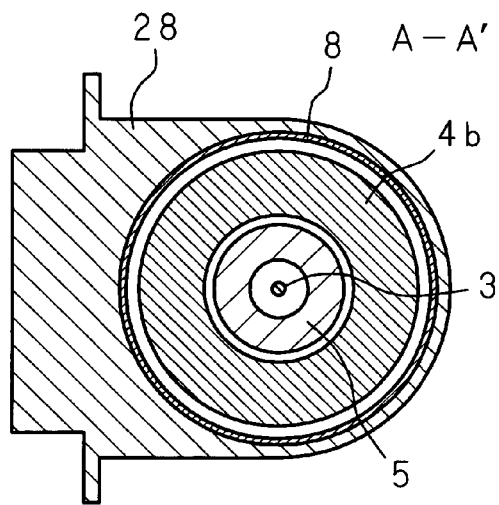

FIGS. 3A to 3C are exemplary views showing a configuration of a torque detecting apparatus according to Embodiment 1 of the present invention. FIG. 3A is an exploded perspective view. FIG. 3B is a vertical sectional view. FIG. 3C is a traverse sectional view taken along the line A-A' of FIG. 3B. The torque detecting apparatus has an input shaft 1 (first shaft) and an output shaft 2 (second shaft) connected to each other coaxially through a small-diameter torsion bar 3 (connecting shaft). The input shaft 1 and the output shaft 2 are connected to the torsion bar 3 by pins 9 respectively.

A cylindrical (24-pole) permanent magnet 5 magnetized circumferentially at equal intervals and having twenty-four poles (twelve N poles and twelve S poles) is coaxially fastened to the input shaft 1. A cylindrical yoke 4 surrounding and spaced radially at a distance from the permanent magnet 5 is coaxially fitted by pressing with the output shaft 2 via a collar 25 (see FIG. 5) which will be described later.

Figure 4:
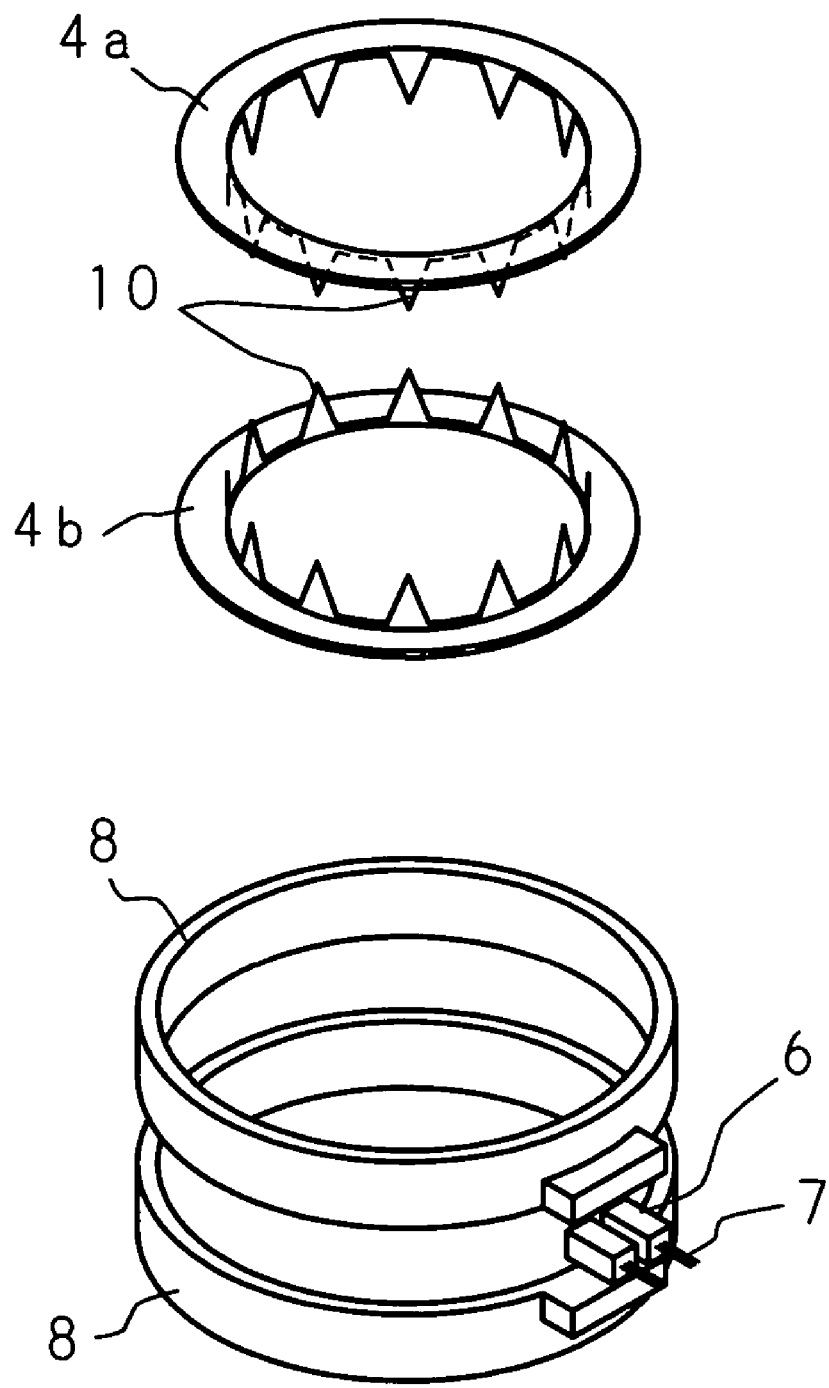
FIG. 4 is an exploded perspective view showing magnetic yokes and magnetism collecting rings in the torque detecting apparatus according to the present invention.

The yoke 4 comprises, as shown in FIG. 4, two magnetic yokes 4a and 4b (soft magnetic members), and each of the magnetic yokes 4a and 4b is a plate-shaped annular ring and has twelve isosceles triangle shaped tabs 10 provided at equal intervals along the circumference thereof to extend in one direction vertically with respect to the plate.

The two magnetic yokes 4a and 4b are cylindrically molded with a mold body 24 made of synthetic resin with their tabs 10 spaced at a distance from and opposing to one another along the circumference. The sides of the magnetic yokes 4a and 4b and the permanent magnet 5 opposing to each other are exposed from the mold body 24.

Moreover, the magnetic yokes 4a and 4b are disposed so that the ends of their tabs 10 correspond to the boundary between the N pole and the S pole of the permanent magnet 5 when remaining at the neutral position as loaded with no torque.

The torque detecting apparatus also has two magnetism collecting rings 8, 8 magnetically coupled to the magnetic yokes 4a and 4b respectively for inducing the magnetic flux from the magnetic yokes 4a and 4b. As shown in FIG. 4, the magnetism collecting rings 8, 8 are arranged parallel to each other and have plate-shaped portions closer to each other than the other portions. Two Hall ICs 6, 6 are inserted into a space between the closer portions of the magnetism collecting rings 8, 8.

The magnetism collecting rings 8, 8 and the Hall ICs 6, 6 are integrally molded with a mold body 28 made of synthetic resin in the above described state. The sides of the magnetic yokes 4a and 4b and the magnetism collecting rings 8, 8 opposing to each other are exposed from the mold body 24 and 28.

The opening between the mold body 24 molding the magnetic yokes 4a and 4b and the permanent magnet 5 is sealed with a sealing member 40 made of, e.g., synthetic resin for preventing any dust such as scrap iron or iron powder from entering.

Also, the upper opening between the mold body 24 molding the magnetic yokes 4a and 4b and the mold body 28 molding the magnetism collecting rings 8, 8 is sealed with a sealing member 38 made of, e.g., synthetic resin, and the lower opening therebetween is sealed with a sealing member 39 made of the synthetic resin for preventing any dust such as scrap iron or iron powder from entering.

Figure 5:
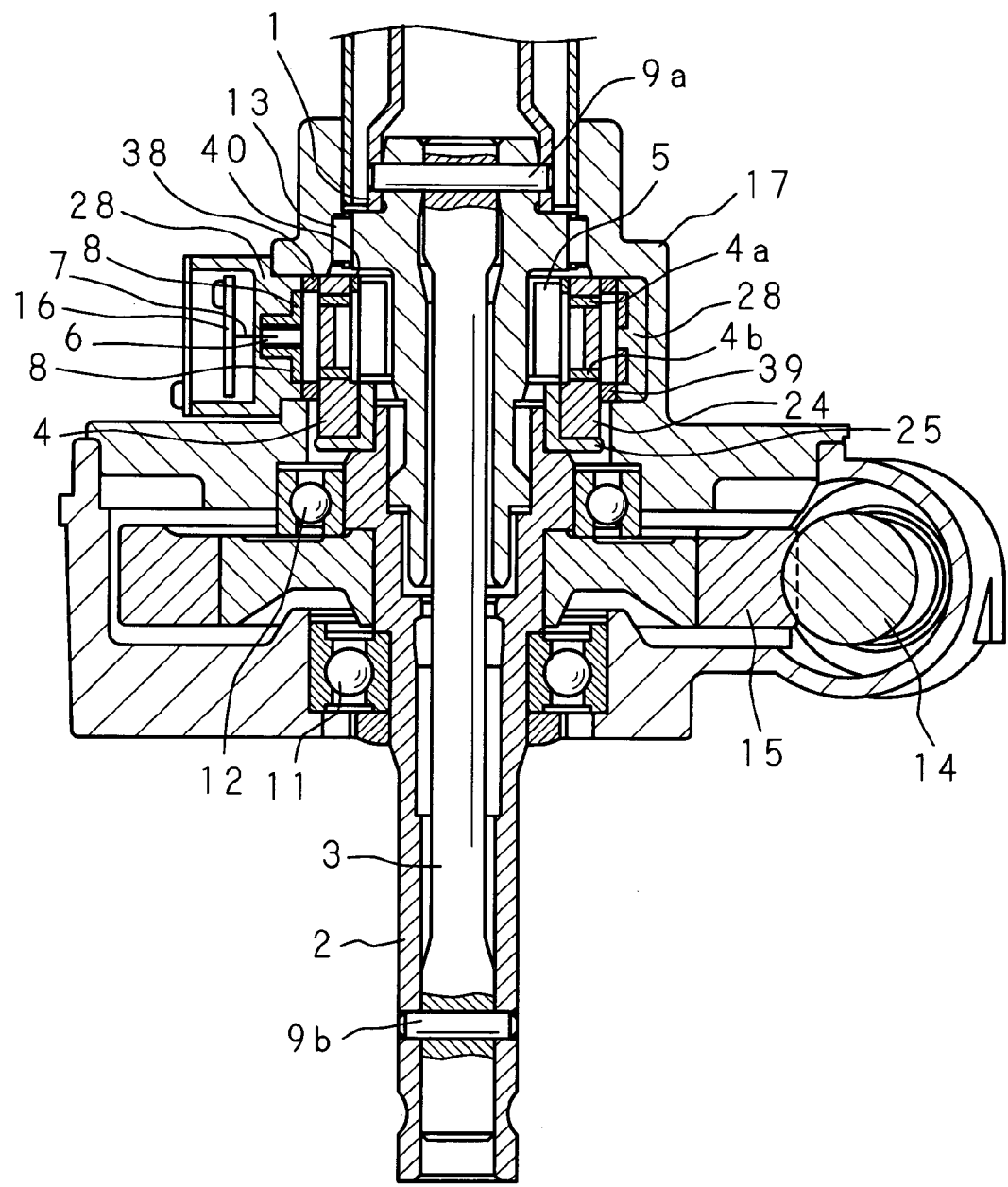
FIG. 5 is a vertical sectional view showing the configuration example of the torque detecting apparatus according to Embodiment 1 of the present invention installed in an electric power steering apparatus.

FIG. 5 is a vertical sectional view showing the configuration example of the torque detecting apparatus as described above installed in an electric power steering apparatus. In the electric power steering apparatus, the input shaft 1 is connected to a steering (wheel) not shown, the upper half of the torsion bar 3 is fitted loosely in the center hollow portion of the input shaft 1 and the upper end of the torsion bar 3 is connected by a pin 9a to the input shaft 1. The lower half of the torsion bar 3 is fitted loosely in the center hollow portion of the output shaft 2 and the lower end of the torsion bar 3 is connected by a pin 9b to the output shaft 2. The lower portion of the input shaft 1 is fitted loosely at the upper portion in the center hollow portion of the output shaft 2. The output shaft 2 is connected to a steering mechanism not shown.

The input shaft 1 is rotatably supported by a bearing 13 to a housing 17 of the electric power steering apparatus. The output shaft 2 is rotatably supported by bearings 11 and 12 to the housing 17.

The output shaft is fixed to a worm wheel 15 which engages with a worm 14 connected to the drive shaft of a steering assist motor.

The permanent magnet 5 is coaxially secured to the input shaft 1. The magnetic yokes 4a and 4b of the yoke 4 molded integrally with the mold body 24 surrounds the permanent magnet 5 radially at a distance. The yoke 4 is coaxially secured via the collar 25 to the output shaft 2 by pressing.

The collar 25 is a cylindrical non-magnetic material, as shown in a plan view of FIG. 6A and a vertical sectional view of FIG. 6B, having a flange provided on one end thereof. The collar 25 is knurled at the outer surface extending from the other end 25b to the flange end 25a and fitted by pressing into the inner bore portion 4c of the yoke 4. The output shaft 2 is fitted by pressing into the collar 25 from the one end.

The collar 25 is made of the material softer than that of the output shaft 2. Even if scraping dusts generate when the output shaft 2 is inserted by pressing, the scraping dusts generate only from the collar 25. The scraping dusts generated from the collar 25 are of the non-magnetic material and will not magnetically affect the magnetic circuit such as the magnetic yokes 4a and 4b.

The two magnetism collecting rings 8, 8 arranged parallel to each other are magnetically coupled with the magnetic yokes 4a and 4b respectively and disposed at the outer side of the magnetic yokes 4a and 4b. The two Hall ICs 6, 6 are inserted between the plate-shaped closer portions of the magnetism collecting rings 8, 8.

The magnetism collecting rings 8, 8 and the two Hall ICs 6, 6 are integrally molded with the mold body 28 which is fixed to the housing 17 of the electric power steering apparatus. The Hall ICs 6, 6 are soldered by lead lines 7 to a circuit board 16 which supplies the Hall ICs 6, 6 with electric power and receives outputs detected by the Hall ICs 6, 6.

The opening between the mold body 24 and the permanent magnet 5 is sealed with the sealing member 40, the upper opening between the mold body 24 and the mold body 28 is sealed with the sealing member 38, and the lower opening therebetween is sealed with a sealing member 39, thereby preventing any dust such as scrap iron or iron powder from entering respectively.

Embodiment 2

Figure 7A:
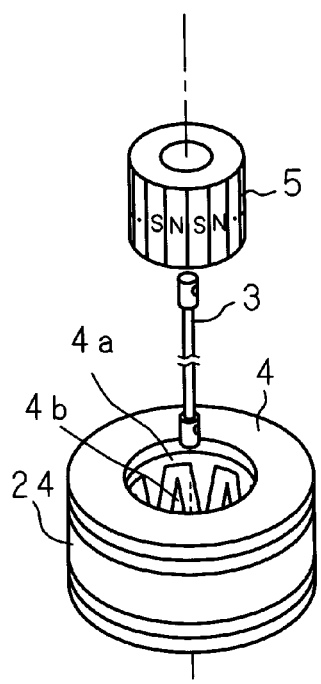
FIGS. 7A to 7C are explanatory views showing a configuration of a torque detecting apparatus according to Embodiment 2 of the present invention.
Figure 7B:
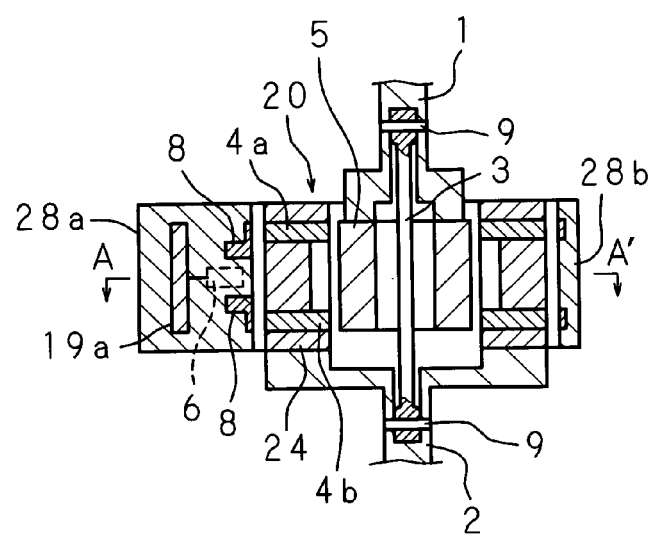
Figure 7C:
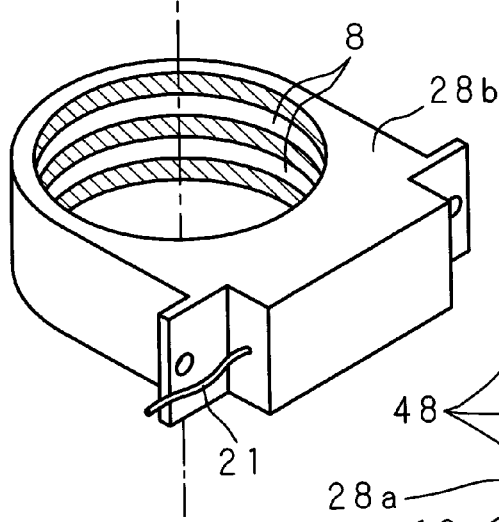
Figure 7C:
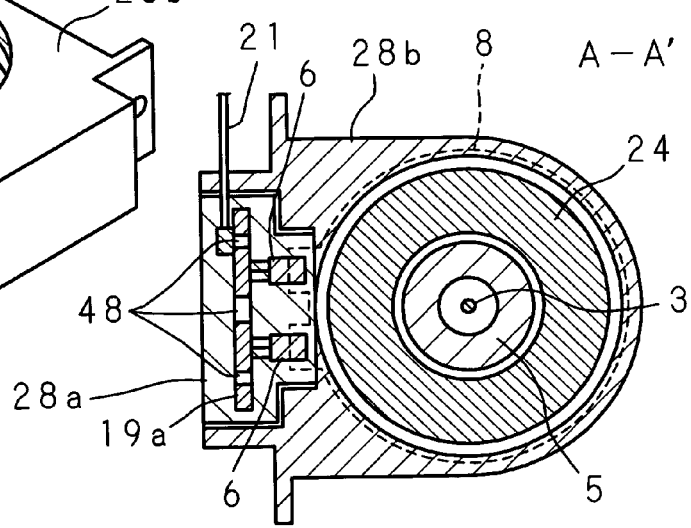

FIGS. 7A to 7C are explanatory views showing a configuration of torque detecting apparatus according to Embodiment 2 of the present invention. FIG. 7A is an exploded perspective view. FIG. 7B is a vertical sectional view. FIG. 7C is a traverse sectional view taken along the line A-A' of FIG. 7B. The torque detecting apparatus of this embodiment has an input shaft 1 (first shaft) and an output shaft 2 (second shaft) connected to each other coaxially by a small-diameter torsion bar 3 (connecting shaft). The input shaft 1 and the output shaft 2 are connected to the torsion bar 3 by pins 9 respectively.

Figure 8:
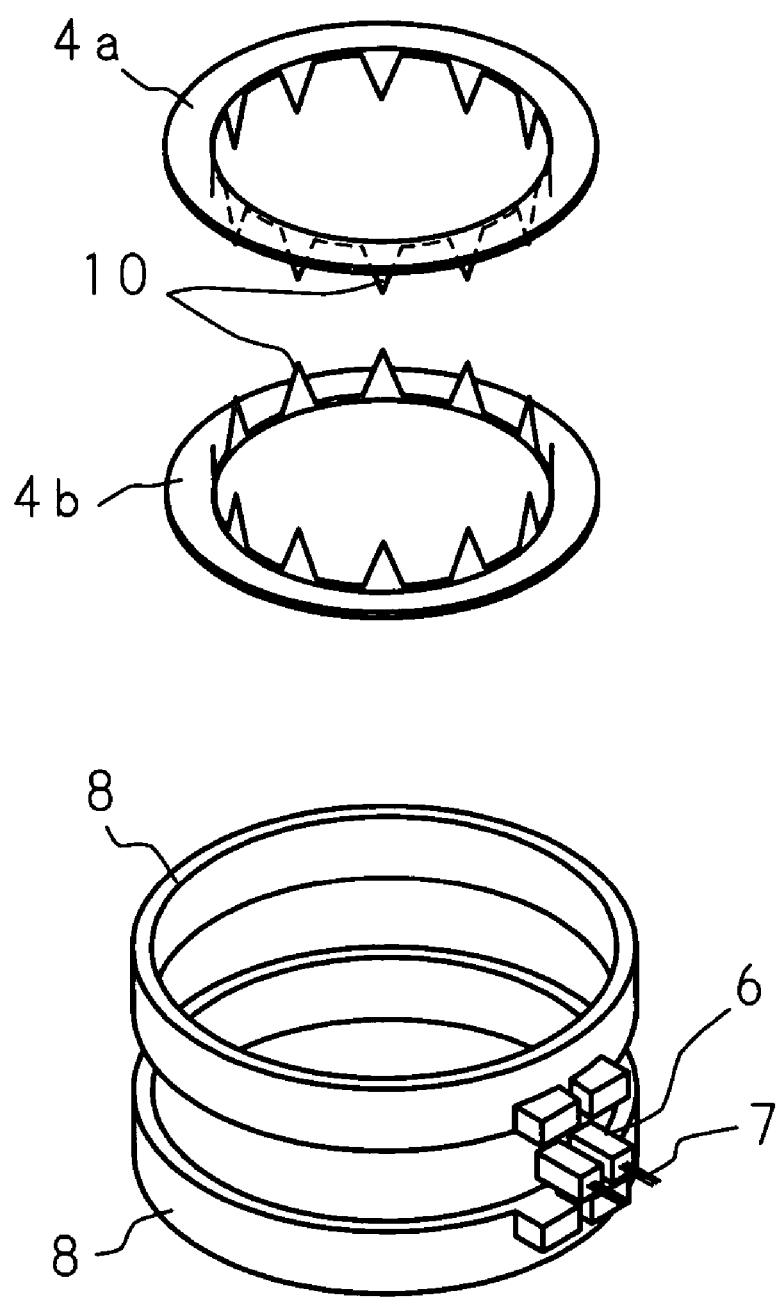
FIG. 8 is an exploded perspective view showing magnetic yokes and magnetism collecting rings in the torque detecting apparatus according to the present invention.

A cylindrical (24-pole) permanent magnet 5 magnetized circumferentially at equal intervals and having twenty-four poles (twelve N poles and twelve S poles) is coaxially secured to the input shaft 1. A cylindrical yoke 4 surrounding and spaced radially at a distance from the permanent magnet 5 is coaxially secured to the output shaft 2. The yoke 4 comprises, as shown in FIG. 8, two magnetic yokes 4a and 4b (soft magnetic members), and each of the magnetic yokes 4a and 4b is a plate-shaped annular ring and has twelve isosceles triangle shaped tabs 10 provided at equal intervals along the circumference thereof to extend in one direction vertically with respect to the plate. The two magnetic yokes 4a and 4b are cylindrically molded with a mold body 24 made of synthetic resin with their tabs 10 spaced at a distance from and opposing to one another along the circumference. The sides of the magnetic yokes 4a and 4b and the permanent magnet 5 opposing to each other are exposed from the mold body 24.

Moreover, the magnetic yokes 4a and 4b are disposed so that the ends of their tabs 10 correspond to the boundary between the N pole and the S pole of the permanent magnet 5 when remaining at the neutral position as loaded with no torque.

The torque detecting apparatus also has two magnetism collecting rings 8, 8 (auxiliary soft magnetic members) magnetically coupled to the magnetic yokes 4a and 4b respectively for inducing the magnetic flux from the magnetic yokes 4a and 4b. As shown in FIG. 8, the magnetism collecting rings 8, 8 are arranged parallel to each other and have plate-shaped portions closer to each other than the other portions. One or a plurality of Hall ICs 6, 6 (detectors) are inserted into a space between the closer portions of the magnetism collecting rings 8, 8.

The magnetism collecting rings 8, 8 and the Hall ICs 6, 6 are, with a circuit board 19a having an electronic circuit connected with the Hall ICs 6, 6, molded with mold bodies 28a and 28b made of synthetic resin in the above described state. The Hall ICs 6, 6 are connected by a plurality of lead lines 7 to the circuit board 19a which is further connected by a cord 21 to an external controller apparatus not shown.

The sides of the magnetic yokes 4a and 4b and the magnetism collecting rings 8, 8 opposing to each other are exposed from the mold bodies 24 and 28b respectively. The molding with the synthetic resin is carried out by two steps. At the first step, the Hall ICs 6, 6 and electric components of the circuit board 19a are molded with the mold body 28a made of synthetic resin having a degree of flexibility (for example, hot melt). Then, at the second step, the magnetism collecting rings 8, 8 are molding with the mold body 28b made of synthetic resin having a degree of rigidity (for example, PET).

Figure 9:
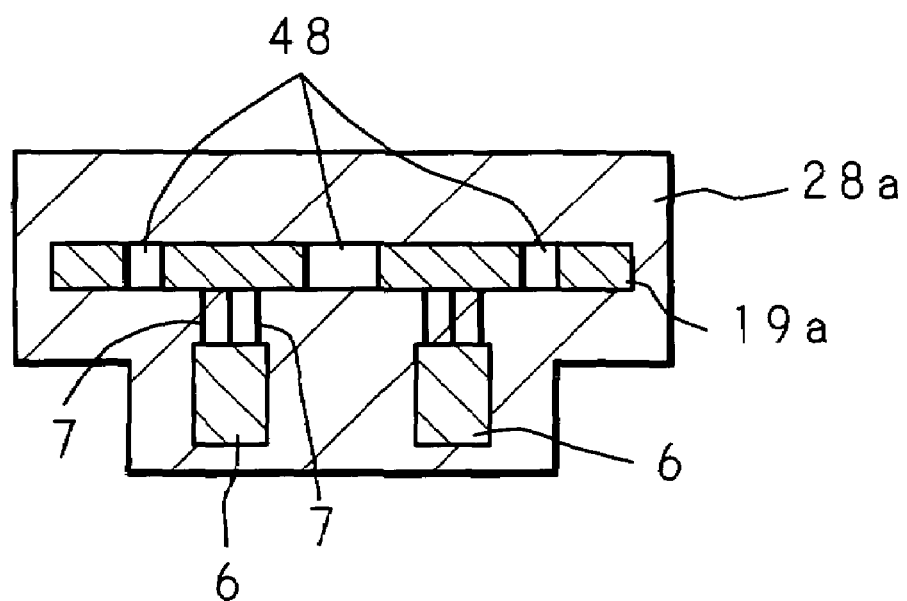
FIG. 9 is an enlarged traverse sectional view showing a circuit board and its peripheral configuration in FIGS. 7B and 7C.

The circuit board 19a has a plurality of through holes 48 provided therein, as shown in an enlarged traverse sectional view of FIG. 9. The through holes 48 in the circuit board 19a are filled with the synthetic resin so that the mold body 28a surrounding the circuit board 19a are physically connected together by the synthetic resin in the through holes 48. Thus the mold body 28a is not detached from the circuit board 19a by the effect of heat or the repeated expansion and contraction, thereby generating no gap between the mold body 28a and the circuit board 19a.

Embodiment 3

FIGS. 10A to 10C are exemplary views schematically showing a configuration of a torque detecting apparatus according to Embodiment 3 of the present invention. FIG. 10A is an exploded perspective view. FIG. 10B is a vertical sectional view. FIG. 10C is a traverse sectional view taken along the line A-A' of FIG. 10B. The torque detecting apparatus of this embodiment has an input shaft 1 (first shaft) and an output shaft 2 (second shaft) connected to each other coaxially by a small-diameter torsion bar 3 (connecting shaft). Moreover, the input shaft 1 and the output shaft 2 are connected to the torsion bar 3 by pins 9 respectively.

A cylindrical (24-pole) permanent magnet 5 magnetized circumferentially at equal intervals and having twenty-four poles (twelve N poles and twelve S poles) is coaxially secured to the input shaft 1.

Figure 11:
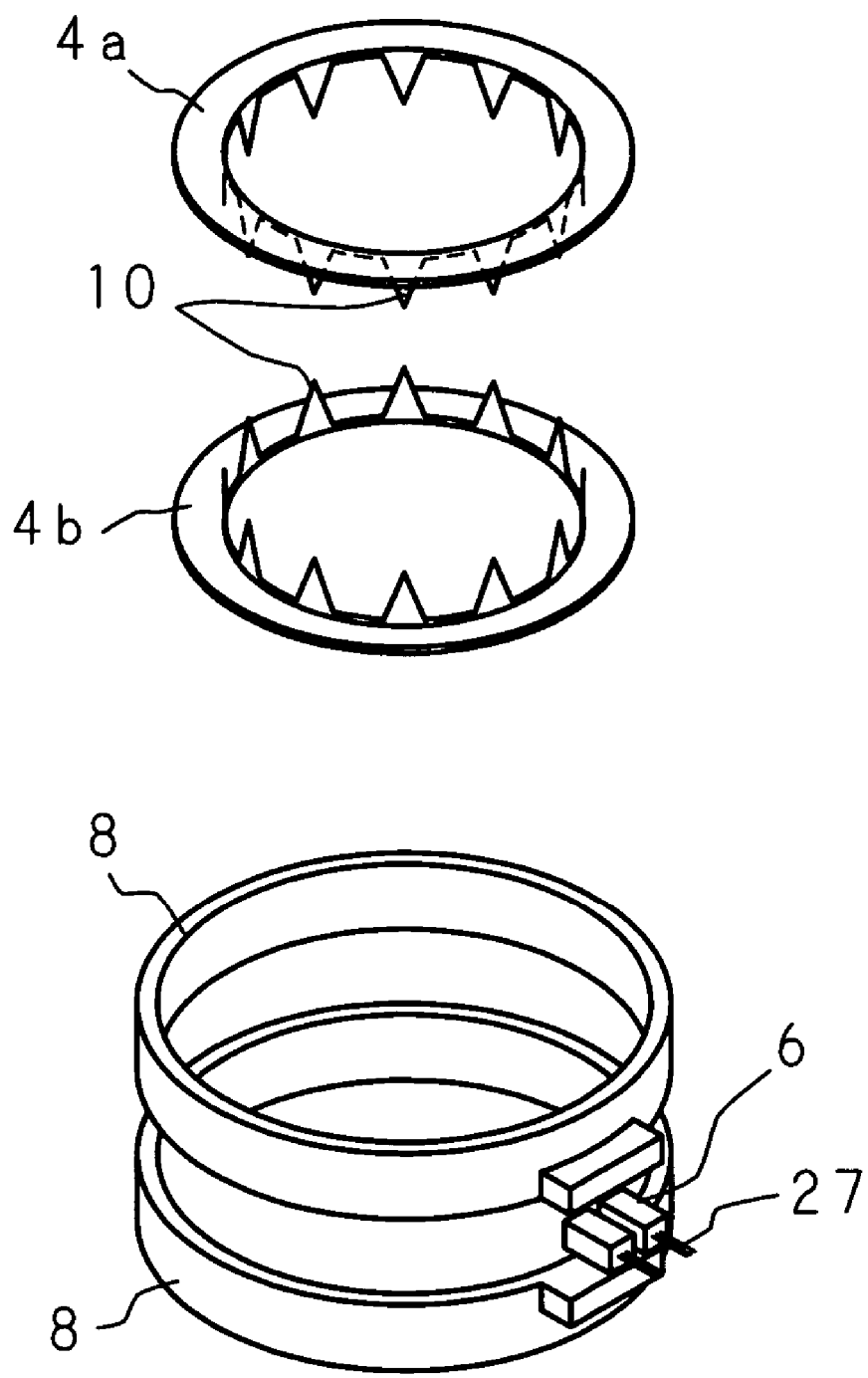
FIG. 11 is an exploded perspective view showing magnetic yokes and magnetism collecting rings in the torque detecting apparatus according to the present invention.

A cylindrical yoke 4 surrounding and spaced radially at a distance from the permanent magnet 5 is coaxially secured to the output shaft 2. The yoke 4 comprises, as shown in FIG. 11, two magnetic yokes 4a and 4b (soft magnetic members), and each of the magnetic yokes 4a and 4b is a plate-shaped annular ring and has twelve isosceles triangle shaped tabs 10 provided at equal intervals along the circumference thereof to extend in one direction vertically with respect to the plate.

The two magnetic yokes 4a and 4b are cylindrically molded with mold body 24 made of synthetic resin with their tabs 10 spaced at a distance from and opposing to one another along the circumference. The sides of the magnetic yokes 4a and 4b opposing to the permanent magnet 5 are exposed from the mold body 24.

Moreover, the magnetic yokes 4a and 4b are disposed so that the ends of their tabs 10 correspond to the boundary between the N pole and the S pole of the permanent magnet 5 when remaining at the neutral position as loaded with no torque.

The torque detecting apparatus also has two magnetism collecting rings 8, 8 (auxiliary soft magnetic members) magnetically coupled with the magnetic yokes 4a and 4b respectively for inducing the magnetic flux from the magnetic yokes 4a and 4b. As shown in FIG. 11, the magnetism collecting rings 8, 8 are arranged parallel to each other and have plate-shaped portions closer to each other than the other portions. Two Hall ICs 6, 6 (Hall devices as detectors) are inserted into a space between the closer portions of the magnetism collecting rings 8, 8.

The magnetism collecting rings 8, 8 and the Hall ICs 6, 6 are integrally molded with a mold body 28 made of synthetic resin in the above described state. The sides of the magnetic yokes 4a and 4b and the magnetism collecting rings 8, 8 opposing to each other are exposed from the mold bodies 24 and 28 respectively.

Each of the Hall ICs 6, 6 has a plurality of pins 27 for connection with external circuits and the pins 27 are projected in a row from the mold body 28.

Figure 12:
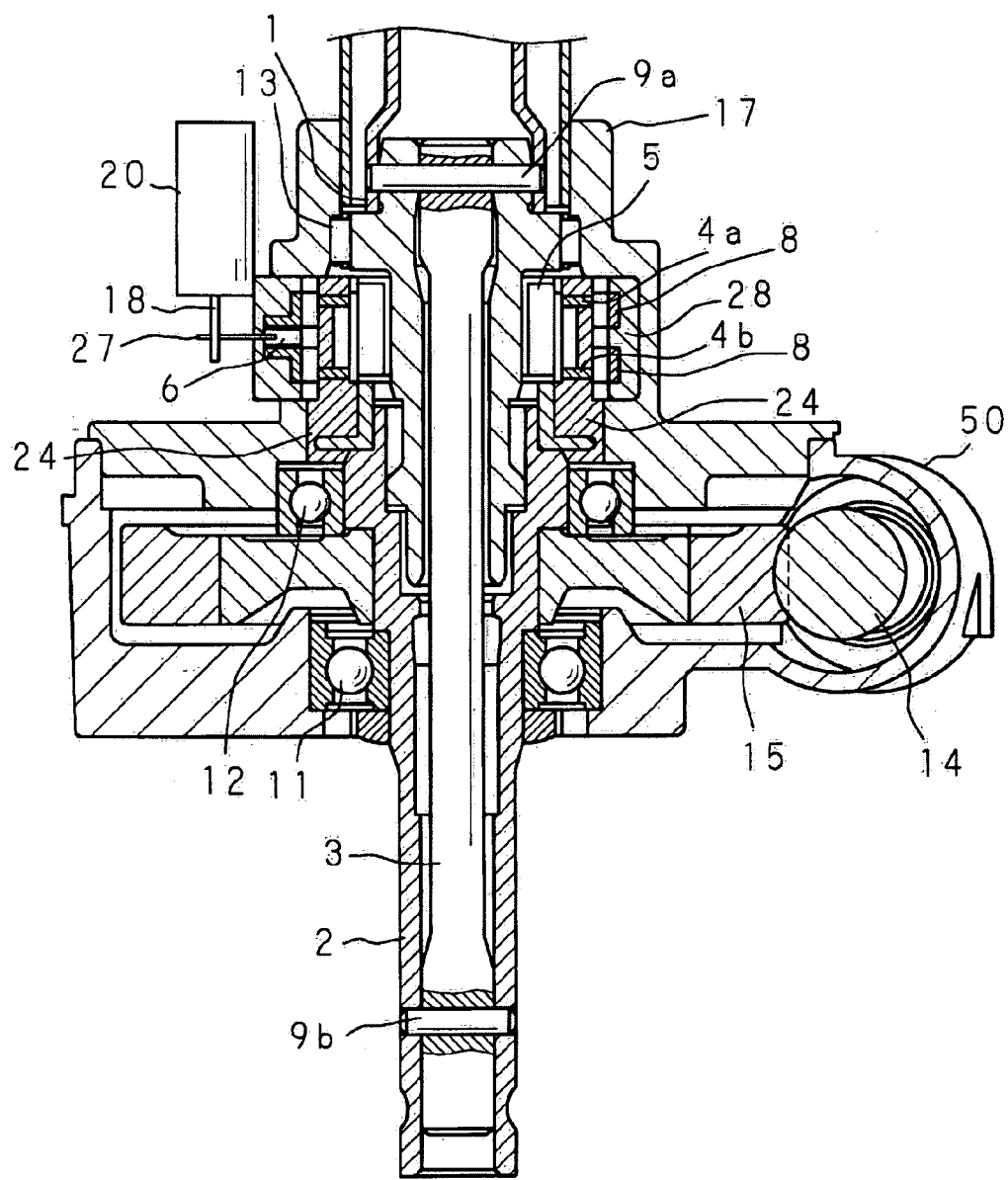
FIG. 12 is a vertical sectional view showing a configuration of an electric power steering apparatus according to Embodiment 3 of the present invention.

FIG. 12 is a vertical sectional view showing a configuration of an electric power steering apparatus, in which the torque detecting apparatus as described above is installed, according to Embodiment 3 of the present invention. In the electric power steering apparatus, the input shaft 1 is connected to a steering (wheel) not shown, the upper half of the torsion bar 3 is fitted loosely in the center hollow portion of the input shaft 1 and the upper end of the torsion bar 3 is connected by a pin 9a to the input shaft 1. The lower half of the torsion bar 3 is fitted loosely in the center hollow portion of the output shaft 2 and the lower end of the torsion bar 3 is connected by a pin 9b to the output shaft 2. The lower portion of the input shaft 1 is fitted loosely at the upper portion in the center hollow portion of the output shaft 2. The output shaft 2 is connected to a steering mechanism not shown.

The input shaft 1 is rotatably supported by a bearing 13 to a housing 17 of the electric power steering apparatus. The output shaft 2 is rotatably supported by bearings 11 and 12 to the housing 17.

A worm wheel 15 is fixed to the output shaft 2 and engages with a worm 14 connected to the drive shaft of a steering assist motor not shown.

The permanent magnet 5 is coaxially secured to the input shaft 1 while the magnetic yokes 4a and 4b surrounding and spaced radially at a distance from the permanent magnet 5 are coaxially secured to the output shaft 2. The two magnetism collecting rings 8, 8 arranged parallel to each other are magnetically coupled to the magnetic yokes 4a and 4b respectively and disposed at the outer side of the magnetic yokes 4a and 4b. The two Hall ICs 6, 6 are inserted in a space between the plate-shaped closer portions of the magnetism collecting rings 8, 8.

The magnetic yokes 4a and 4b are integrally molded with the mold body 24. The magnetism collecting rings 8, 8 and the Hall ICs 6, 6 are integrally molded with the mold body 28. The mold body 28 is fixed to the housing 17 of the electric power steering apparatus. Each of the Hall ICs 6, 6 has a plurality of pins 27 provided for connection to the outside. More specifically, the pins 27 are projected in a row from the mold body 28 and connected to a printed board 18 (a PCB or a glass epoxy substrate etc.) which protrudes from an electronic control unit casing 20 (housing).

The electronic control unit casing 20 contains a drive-control unit for the electric power steering apparatus and a circuit (a noise-resistance condenser etc.) related to the Hall ICs 6, 6. The electronic control unit casing 20 is fixed on the housing 17 or to a vehicle body not shown.

Figure 13:
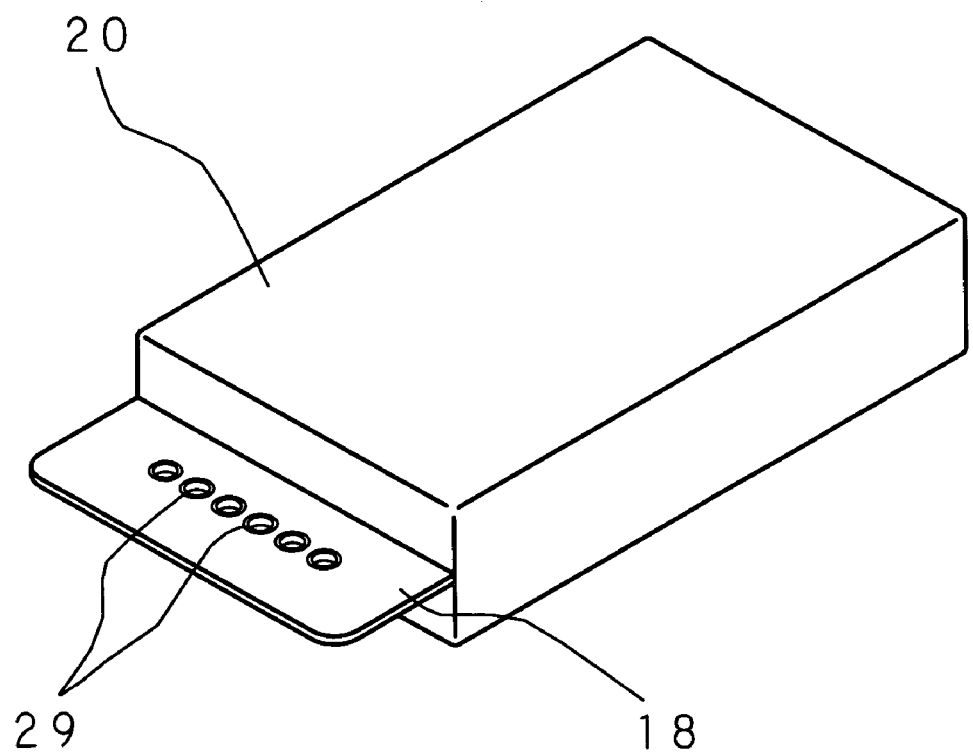
FIG. 13 is a perspective view showing an external example of an electronic control unit casing.

FIG. 13 is a perspective view showing an external of the electronic control unit casing 20.

The electronic control unit casing 20 is of a rectangular parallelepiped shape. The printed board 18 (a circuit board) is projectingly mounted on one side at one longitudinal end of the electronic control unit casing 20. The printed board 18 has six through holes 29 provided in a row.

Figure 14:
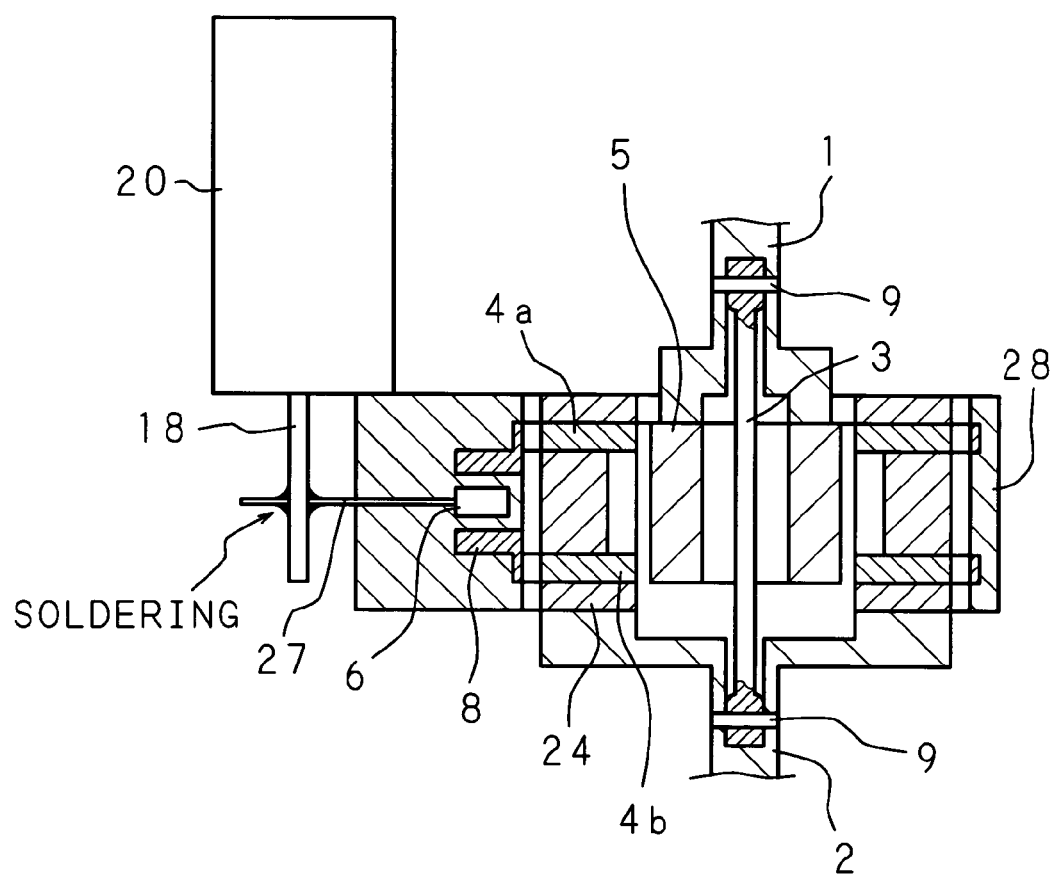
FIG. 14 is an explanatory view schematically showing a connection of the torque detecting apparatus to the electronic control unit casing.

The torque detecting apparatus and the electronic control unit casing 20 are connected to each other by running the pins 27 of the Hall ICs 6, 6 through the corresponding through holes 29 of the printed board 18 respectively and then soldering the pins 27 and the through holes 29, as schematically shown in FIG. 14. Thus, the Hall ICs 6, 6, their related circuit, and the drive-control unit for the electronic power steering apparatus are connected together.

Figure 15A:
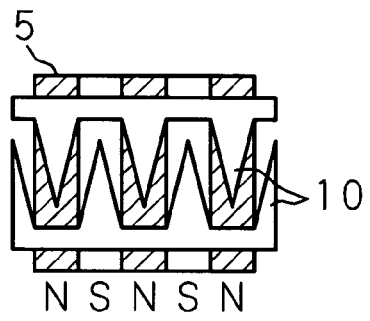
FIGS. 15A to 15D are explanatory views showing performance of the torque detecting apparatus and the electric power steering apparatus according to the present invention.
Figure 15B:
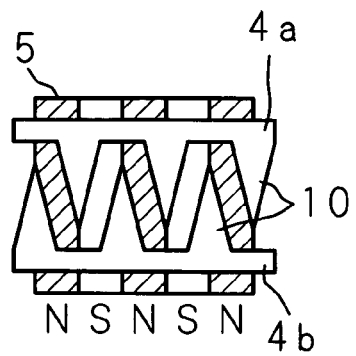

The performance of the electric power steering apparatus and its torque detecting apparatus of Embodiments 1 to 3 will now be described in more detail. When the steering is not operated and no torque is applied to the input shaft 1, the tabs 10 of the magnetic yokes 4a and 4b remain no difference in the areas facing the N poles and the S poles of the permanent magnet 5, as shown in FIG. 15B. As the magnetic flux received from the N poles is equal to the magnetic flux directed to the S poles, there is not magnetic flux generated between the magnetic yokes 4a and 4b.

When the steering in one direction is operated and its resultant torque is applied to the input shaft 1, the torsion bar 3 twists to change the position of the tabs 10 of the magnetic yokes 4a and 4b relative to the permanent magnet 5. For example, as shown in FIG. 15A, when the facing area of the tabs 10 of the magnetic yoke 4a becomes greater against the N poles than the S poles of the permanent magnet 5, the magnetic flux received from the N poles is higher than the magnetic flux directed to the S pole. Simultaneously, when the facing area of the tabs 10 of the magnetic yoke 4b becomes smaller against the N poles than the S poles of the permanent magnet 5, the magnetic flux received from the N poles is lower than the magnetic flux directed to the S pole. As a result, magnetic flux is generated from the magnetic yoke 4a to the magnetic yoke 4b. The greater the difference in the area of the N poles and the S poles facing the tabs 10, the higher the magnetic flux will be increased in the density.

Figure 15C:
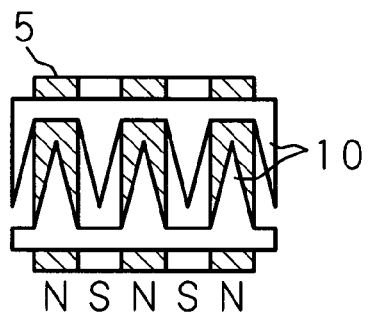

When the steering in the opposite direction is operated and its resultant torque is applied to the input shaft 1, the torsion bar 3 twists in a reverse of the previous direction to change the position of the tabs 10 of the magnetic yokes 4a and 4b relative to the permanent magnet 5. For example, as shown in FIG. 15C, when the facing area of the tabs 10 of the magnetic yoke 4a becomes smaller against the N poles than the S poles of the permanent magnet 5, the magnetic flux received from the N poles is lower than the magnetic flux directed to the S pole. Simultaneously, when the facing area of the tabs 10 of the magnetic yoke 4b becomes greater against the N poles than the S poles of the permanent magnet 5, the magnetic flux received from the N poles is higher than the magnetic flux directed to the S pole. At this time, magnetic flux is generated from the magnetic yoke 4b to the magnetic yoke 4a. Similarly, the greater the difference in the area of the N poles and the S poles facing the tabs 10, the higher the magnetic flux will be increased in the density.

Figure 15D:
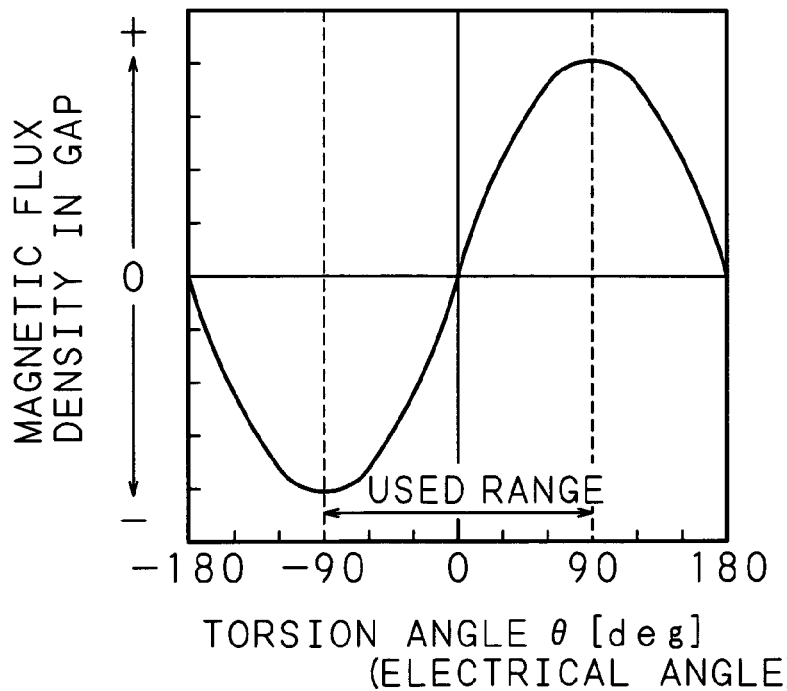

FIG. 15D illustrates a sine waveform of the relationship where the density of the magnetic flux generated in a gap between the magnetic yokes 4a and 4b is varied with the electrical angle from −180 to 180 degrees (the mechanical angle from −15 to 15 degrees) representing the torsion angle of the torsion bar 3. In fact, the torsion angle will never exceed the range from −90 to 90 degrees because of the rigidity of the torsion bar 3.

The magnetic flux generated between the magnetic yokes 4a and 4b depending on the magnetic flux density in a gap between the magnetic yokes 4a and 4b is induced by the magnetism collecting rings 8, 8. As the induced magnetic flux is converged between the closer portions of the magnetism collecting rings 8, 8, the magnetic flux is detected by the Hall ICs 6, 6. The Hall ICs 6, 6 thus calculates an average of the magnetic flux density generated throughout the magnetic yokes 4a and 4b due to the magnetism collecting rings 8, 8.

As set forth above, the Hall ICs 6, 6 can detect the density of the magnetic flux generated in the magnetism collecting rings 8, 8, namely the magnetic flux density corresponding to the torque applied to the input shaft 1. More specifically, the torque caused by the steering can be detected from the magnetic flux density. Particularly, when the direction of detection at the Hall ICs 6, 6 is reversed and a difference is calculated between the outputs, resultant undesired effects derived from the deflection, the thermal properties of the Hall ICs 6, 6, and the detection sensitivity along the axial directions can be offset, thus contributing to the improvement of the detection accuracy.

Note that Embodiment 2 of the present invention may be modified by the Hall ICs 6, 6 detecting directly the magnetic flux generated between the magnetic yokes 4a and 4b while the magnetism collecting rings 8, 8 eliminated thereby detecting the torque similarly.

Note that, according to Embodiment 3 of the present invention, the drive-control unit in the electronic control unit casing 20 controls and drives the electrical motor for steering assistance not shown based on the magnetic flux density detected by the Hall ICs 6, 6 namely the torque caused by the steering so as to minimize the torque. As a result, the electrical motor provides the steering mechanism not shown with its steering assist force thus to reduce the steering force needed for the steering.

As this present invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A torque detecting apparatus comprising:
a first shaft and a second shaft connected coaxially to each other through a connecting shaft;
a permanent magnet fixed to the first shaft;
a plurality of soft magnetic members fixed to the second shaft and disposed in a magnetic field of the permanent magnet to form a magnetic circuit; and
a detector connected with a circuit board for detecting the magnetic flux generated from the soft magnetic members, wherein
the detector and the circuit board are molded with synthetic resin,
when a torque is applied to the first shaft or the second shaft, the torque is detected based on an output of the detector, and
the circuit board has one or a plurality of through holes which are entirely filled with the synthetic resin.

2. A torque detecting apparatus comprising:
a first shaft and a second shaft connected coaxially to each other through a connecting shaft;
a permanent magnet fixed to the first shaft;
a plurality of soft magnetic members fixed to the second shaft and disposed in a magnetic field of the permanent magnet to form a magnetic circuit;
a plurality of auxiliary soft magnetic members magnetically coupled to the soft magnetic members for inducing magnetic flux from the soft magnetic members; and
a detector connected with a circuit board for detecting the magnetic flux induced by the auxiliary soft magnetic members, wherein
the detector and the circuit board are molded with synthetic resin,
when a torque is applied to the first shaft or the second shaft, the torque is detected based on an output of the detector, and
the circuit board has one or a plurality of through holes which are entirely filled with the synthetic resin.

3. A torque detecting apparatus comprising:
a first shaft and a second shaft connected coaxially to each other through a connecting shaft;
a permanent magnet and a plurality of soft magnetic members molded in a first mold body fixed coaxially and magnetically coupled to the first shaft and the second shaft respectively;
a plurality of auxiliary soft magnetic members magnetically coupled to the soft magnetic members;
one or a plurality of detectors for detecting magnetic flux induced by the auxiliary soft magnetic members; and
a second mold body made of synthetic resin for molding the auxiliary soft magnetic members and the detectors,
at least one sealing member for sealing an opening between the first and second mold bodies, wherein a torque applied to the first shaft or the second shaft is detected based on an output of the detector, and the detector has a plurality of pins each extending at one end directly from the detector and projecting at the other end from the second mold body respectively, for connection with the outside.

4. An electric power steering apparatus comprising:

an electric motor for steering assistance;

a torque detecting apparatus defined in claim 3; and a drive-control unit contained in a housing for controlling the drive of the electric motor based on torque detected by the torque detecting apparatus, wherein the housing includes a circuit board projected therefrom and having a plurality of through holes, and the drive-control unit is connected with the torque detecting apparatus by inserting the pins projected from the second mold body of the torque detecting apparatus into the through holes respectively.

* * * * *